United States Patent [19]

Rosario

[11] Patent Number: 5,022,027
[45] Date of Patent: Jun. 4, 1991

[54] COMMUNICATIONS INTERFACE AND SYSTEM FOR RADIATION RECOVERY OF A MICROPROCESSOR PORTION THEREOF

[75] Inventor: Jesus A. Rosario, Beltsville, Md.

[73] Assignee: The United States of America as represented by the Secretary of the Navy, Washington, D.C.

[21] Appl. No.: 382,977

[22] Filed: May 27, 1982

[51] Int. Cl.$^5$ ............................................. G06F 11/00
[52] U.S. Cl. ......................................... 371/12; 371/7; 376/245
[58] Field of Search ........................ 371/11, 12, 14, 7; 307/308; 376/245

[56] References Cited

U.S. PATENT DOCUMENTS

| | | | |
|---|---|---|---|
| 3,725,861 | 4/1973 | Hancock | 371/7 |
| 3,795,800 | 3/1974 | Nimmo | 371/12 |
| 4,031,374 | 6/1977 | Groudan et al. | 307/308 X |
| 4,044,337 | 8/1977 | Hicks et al. | 371/12 X |
| 4,059,762 | 11/1977 | Horrocks | 250/336.1 |
| 4,151,484 | 4/1979 | Robe | 307/308 X |
| 4,351,050 | 9/1982 | Higashiyama | 371/12 |

Primary Examiner—Salvatore Cangialosi
Attorney, Agent, or Firm—Kenneth E. Walden; John G. Wynn

[57] ABSTRACT

A communications interface and system is configured to allow circumvention (recovery of control after radiation) of a microprocessor portion thereof. The communications interface portion, including a hard memory interface device serves as a communications link to the microprocessor. The system is configured so that a transient upset from prompt gamma radiation is detected and a circuit freeze of the stored information in the system is carried out until the transient subsides. The system then restores the microprocessor to the preirradiation condition and resumes operation. Accordingly, the hard memory interface device of the communications interface, controls a READ operation and CLEAR and WRITE operations in addition to generating signals to control the "handshaking" between the hard memory of the communications interface and the aforementioned microprocessor.

3 Claims, 2 Drawing Sheets

COMMUNICATIONS INTERFACE AND SYSTEM FOR RADIATION RECOVERY OF A MICROPROCESSOR PORTION THEREOF

BACKGROUND OF THE INVENTION

1. Field of the Invention

The present invention relates generally to radiation hardened circuitry, and more particularly to a communications interface and system configured to allow circumvention of a microprocessor portion thereof.

2. Description of the Prior Art

The use of components which have the highest intrinsic radiation tolerance is a logical and cost effective approach to radiation hardening. This component selection technique is routinely applied to minimize the problem of neutron degradation and total gamma degradation. It is less frequently used for radiation hardening against transient upset from prompt gamma radiation primarily because of the high degree of sensitivity most solid state components have to ionizing dose rate. Thus, hardening solid state circuits against prompt gamma radiation using component selection only works for relatively low ionizing rates less then about $1 \times 10^8$ rad(-Si)/sec. maximum, a level above which most unhardened solid state circuits can be expected to be upset. In addition, the radiation responses of individual components and circuits often aggravate other circuits to which they are connected. These synergetic effects often create upsets at levels below the individual component levels and complicate further the selection of components. Consequently, there is a need in the prior art to eliminate the necessity for selection of every component having the highest intrinsic radiation tolerance to minimize the effects of radiation. There is an additional need in the prior art to protect against prompt gamma radiation in an improved manner.

Circumvention, in its most common form, is a circuit design technique in which the outputs of critical circuits during exposure to radiation or for sometime after. A key feature of this technique is that the passage of radiation produced signals from unhardened circuits can be blocked. Circumvention techniques also embrace those designs which restore the system to preirradiation status after exposure or keep it functioning in a minimal condition until it can be restored. Cancellation techniques can also be considered aspects of the circumvention techniques.

Digital circuits and computers or microprocessors present the hardening circuits designer with a very challenging problem. Generally, computers can be expected to be upset during prompt gamma radiation and may have to be completely restarted. In some manned systems, computer restart is a valid approach, but in unmanned missiles and even in critical shipboard equipment, such as fire control systems, a better alternative is needed. Hence, there is a need in the prior art to eliminate the need to harden every circuit in a system to prompt gamma radiation by configuring the system to use certain hardened circuits along with certain unhardened circuits so as to allow the system to recovery from prompt gamma radiation.

The prior art and background, as indicated hereinabove, includes some advances in radiation hardening and recovery techniques. However, as far as can be determined, no prior art radiation recovery system for circumvention of microprocessors incorporate all of the features and advantages of the present invention.

OBJECTS OF THE INVENTION

Accordingly, an important object of the present invention is to configure a communications link between a microprocessor and radiation hardened memory such that vital information can be saved, changed, and retrieved for future use by a microprocessor.

Yet another important object of the present invention is to protect against prompt gamma radiation in an improved manner.

Still another important object of the present invention is to eliminate the necessity for selection of every circuit component having the highest transient radiation tolerance to minimize the effects of radiation in an improved manner.

SUMMARY OF THE INVENTION

In accordance with the above stated objects, other objects, features and advantages, the present invention has as a primary purpose to allow circumvention of a microprocessor after radiation thereof by prompt gamma radiation. The foregoing is accomplished using radiation hardened and radiation soft components in a unique circumvention configuration.

The essence of the present invention is in the use of a communications interface comprising a hard memory and a hard memory interface device to control READ, CLEAR, and WRITE operations in addition to generating signals to control the "handshaking" between the hard memory and the aforementioned microprocessor.

The purpose of the present invention is carried out by resetting the microprocessor to execute a radiation recovery routine when a pulse from a radiation detector interrupts a normal operational program. A two page memory format is used to ensure that valid data is still available in the hard memory. This valid data is restored by the radiation recovery routine to enable the microprocessor to continue execution of the normal operational program from the point of which it was interrupted by the transient radiation.

BRIEF DESCRIPTION OF THE DRAWINGS

The previously stated objects, other objects, features and advantages of the present invention will be apparent from the following more particular description of the preferred embodiment as illustrated in the accompanying drawings, in which.

DESCRIPTION OF THE PREFERRED EMBODIMENT

Figure 1:
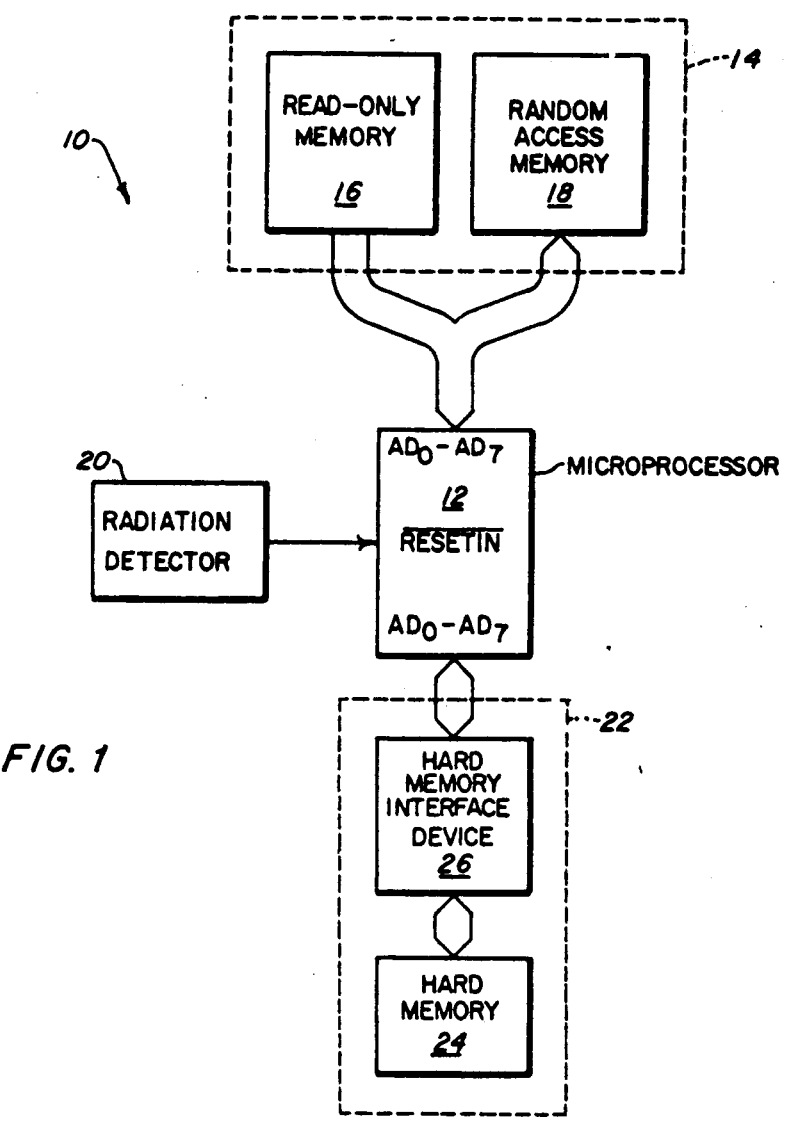
FIG 1 is a block diagram representation of the microprocessor radiation and recovery system, including a radiation detector, according to the present invention.

FIG. 1 shows an embodiment of a radiation recovery system 10 in which the present invention is employed to allow circumvention of a microprocessor 12 portion thereof. Basically, radiation recovery system 10 comprises the aforementioned microprocessor 12 which is operatively connected to a radiation recovery system memory 14 via address/data lines, $AD_0$–$AD_7$. Radiation recovery system memory 14 includes a read-onlymemory (ROM) 16 operatively connected to address-/data lines, $AD_0$–$AD_7$, of microprocessor 12. Read-only memory 16 contains a normal operational program and a radiation recovery routine. Radiation recovery system memory 14 also includes a random access memory 18 (RAM) also operatively connected to microprocessor 12 via address/data lines, $AD_0$–$AD_7$, for the temporary storage of information used in running the normal operational program and generated thereby.

To continue, radiation detector 20 is connected to RESETIN of microprocessor 12. For purposes of the present invention, microprocessor 12 is an Intel 8085A 8-bit N-channel microprocessor. This particular microprocessor was selected because of its wide spread use in military systems. However, it should be understood that any microprocessor or central processing unit that can tolerate a reset under prompt gamma radiation conditions can be used in configuring the present invention.

Still referring to the block diagram representation of FIG. 1, a communications interface 22 is operatively connected to the address/data lines, $AD_0$–$AD_7$, of microprocessor 12 for storing information that is continuously generated by the normal operational program. Communications interface 22 includes a hard memory 24 and a hard memory interface device 26. Hard memory 24 stores, in a two page format, information that is continuously generated by the normal operational program and used by the radiation recovery routine for subsequent updating of random access memory 18. Hard memory interface device 26 is operatively connected between hard memory 24 and microprocessor 12 for controlling READ, WRITE and CLEAR operations of hard memory 24. Hard memory interface device 26 also controls the handshaking between hard memory 24 and microprocessor 12. For purposes of the invention, hard memory interface device 26 comprise combinational logic gates. These gates compensate for differences in voltage levels between hard memory 24 and microprocessor 12, and also provide the right control signals to hard memory 24. It should be understood that a delay in the read/write operation can be included in hard memory interface device 26 to compensate for the fastest speed at which, for example microprocessor 12 operates. Practically, this delay works by pulling the "READY" line to a logic 0 which includes a "wait" state in microprocessor 12. Microprocessor 12 will remain in the "wait" state until the logic 0 is replaced by a logic 1. When this happens microprocessor 12 will continue the running of the normal operational program.

For purposes of the present invention, a Westinghouse WX6030 (1K bits) radiation-hard memory can be used for hard memory 24, and read-only memory 16 can be a programmable read-only memory (PROM) AM27519 from Advance Micro Devices (AMD).

Figure 2:
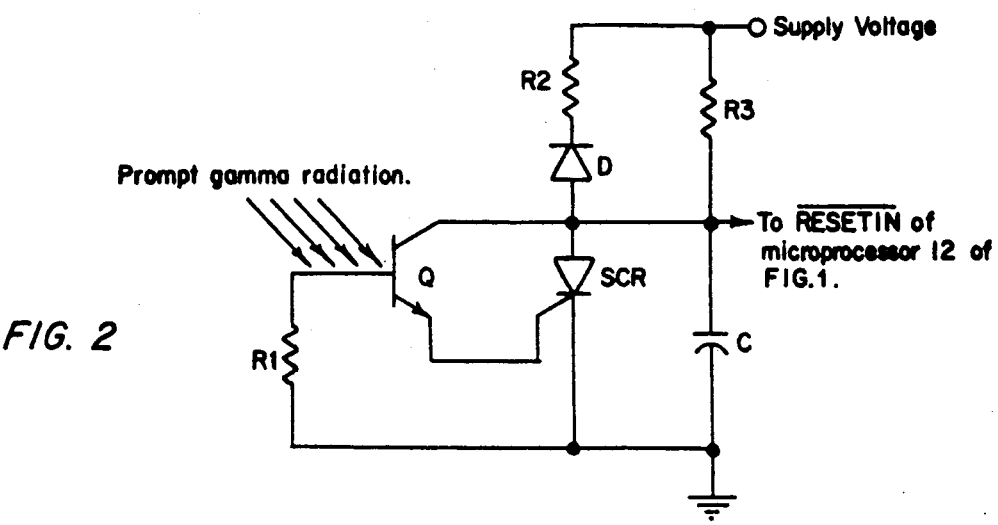
FIG. 2 is a schematic diagram representation of the radiation detector of FIG. 1.

Referring now to FIG. 2, radiation detector 20 comprises, inter alia, a transistor Q, a silicon control rectifier (SCR), and a capacitor C. Basically, radiation detector 20 is configured so that each time the prompt gamma radiation level reaches a point which causes transistor Q to conduct (about $10^7$ rad/sec.), the SCR is triggered, and capacitor is C discharged. This action produces a negative-going pulse which is connected directly to RESETIN of microprocessor 12.

STATEMENT OF THE OPERATION

Figure 3:
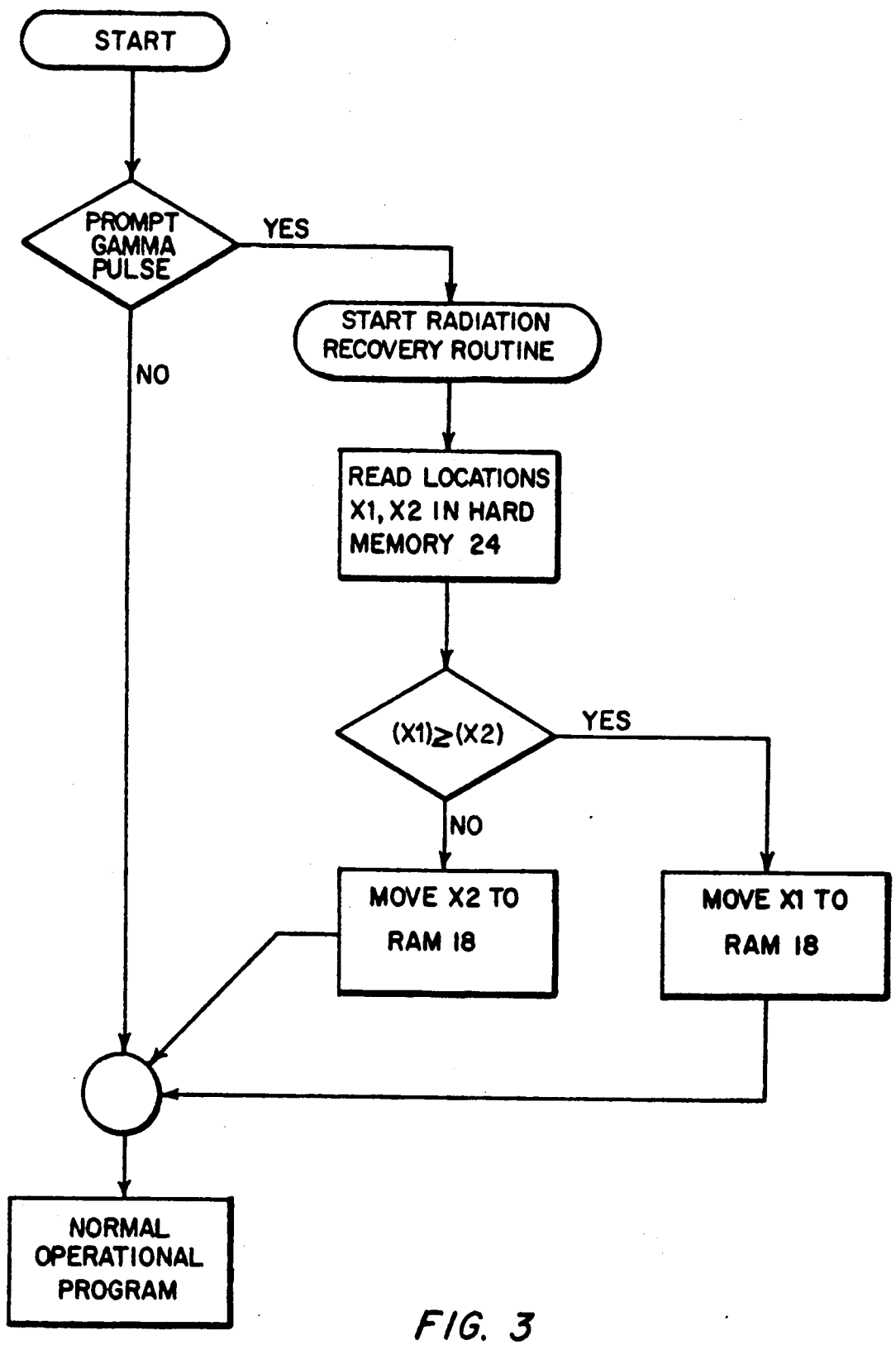
FIG. 3 is a program flowchart used in discussing the operation of the recovery system of FIG. 1 during radiation exposure thereof.

Details of the operations, according to the present invention, are explained in conjunction with FIGS. 1 and 3 viewed concurrently.

The normal operational program contains the task that is being executed by microprocessor 12 when it is not being influenced by the effects of prompt gamma radiation. The task, in general, involves the use of random access memory 18 of radiation recovery system memory 14 where information generated by the normal operational program is stored temporarily. Normally, random access memory 18 is chosen to be compatible with microprocessor 12 and should run at a much faster speed than hard memory 24 of communications interface 22. Where speed is not a primary factor and hard memory 24 is compatible in logic levels and control lines with microprocessor 12, then hard memory interface device 26 can be eliminated.

The normal operational program can be a very sophisticated sequence of instructions. As the complexity of the normal operational program increases, the number of "words" that need to be recovered after radiation will increase. For the foregoing reason, the normal operational program should include a portion that stores the information necessary for recovery from radiation in hard memory 24. The normal operational program must also keep updating this information. This vital information is stored in, what could be called a two page configuration or format. For example, assume that the aforementioned information concerns velocity. Then, in the first cycle the velocity information at the point in time is stored in a location X1 of hard memory 24, and in the next cycle the velocity information at that point in time close to the first is stored in a location X2 of hard memory 24. Using this technique, good velocity information is assured in the location X1 if the information in location X2 is altered by the prompt gamma radiation.

The complexity of the radiation recovery routine depends on how many "words" of information are to be read from hard memory 24 and subsequently restored for recovery in random access memory 18. The radiation recovery routine should include instructions for determining which location (X1, X2) of the two pages in hard memory 24 should be retrieved. After the foregoing check, the relation recovery routine should cause movement of all the information needed to random access memory 18, and should cause restoration of execution of the normal operational program that is in read-only memory 16.

As an added feature, the radiation recovery routine should be able to differentiate between signals generated during power-up or power failure and the prompt gamma radiation pulse generated by radiation detector 20. One possible way to accomplish the foregoing is to connect a circuit which is capable of sensing transient power supply changes to one of the interrupt lines of microprocessor 12. Accordingly, a normal operational program could check for this type of interrupt to determine if it is in fact a power-up or a radiation RESETIN type of transient.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. A radiation recovery system configured to allow recovery of control of a normal operational program after radiation of a microprocessor portion thereof by prompt gamma radiation, comprising in combination:
   a radiation recovery system memory operatively connected to address/data lines, $AD_0$–$AD_7$, of said microprocessor for storing information generated by the normal operational program, for storing the normal operational program and a radiation recovery routine, and for enabling said microprocessor to read the normal operational program and the radiation routine;
   a radiation detector operatively connected to the $\overline{\text{RESETIN}}$ line of said microprocessor for sensing a predetermined level of the prompt gamma radiation, and for producing a pulse in response thereto at the $\overline{\text{RESETIN}}$ line; and
   a communications interface operatively connected to the address/data lines, $AD_0$–$AD_7$, of said microprocessor for storing information that is continuously generated by the normal operational program in cooperation with said microprocessor, for controlling READ, WRITE, and CLEAR operations, and for controlling the handshaking between said communications interface and said microprocessor, said communications interface being configured to include a hard memory for storing, in a two page format, the information that is continuously generated by the normal operational program and used by the radiation recovery routine for subsequent updating of said random access memory, the information stored being that which is necessary for recovery of the normal operational program after radiation, and a hard memory interface device operatively connected between said hard memory and said microprocessor for controlling READ, WRITE, and CLEAR operations of said hard memory, and for controlling the handshaking between said hard memory and said microprocessor.

2. The radiation recovery system of claim 1 wherein said radiation recovery system memory further comprises:
   a read-only memory operatively connected to the address/data lines, $AD_0$–$AD_7$, of said microprocessor for reading-out a predetermined radiation recovery routine and the normal operational program store therein, said read-only memory being hardened against the prompt gamma radiation; and
   a random access memory operatively connected to the address/data lines, $AD_0$–$AD_7$, of said microprocessor for reading-out stored information and for writing-in information via said microprocessor.

3. The radiation recovery system of claim 2 wherein the predetermined level of the prompt gamma radiation for producing a pulse in response thereto to the RESETIN line of said microprocessor is less than that required for disrupting operation thereof but, greater than $1 \times 10^7$ rad/sec.

* * * * *